United States Patent [19]

Hermes et al.

[11] 3,940,104
[45] Feb. 24, 1976

[54] MOLD FOR DIE-CAST ROTOR HOUSING FOR ROTARY COMBUSTION ENGINES

[75] Inventors: Walter Ludwig Hermes, Cedar Grove; Murray Berkowitz, Woodcliff Lake; Charles Lombaerde, Ridgewood, all of N.J.

[73] Assignee: Curtiss-Wright Corporation, Wood-Ridge, N.J.

[22] Filed: Apr. 2, 1975

[21] Appl. No.: 564,359

Related U.S. Application Data

[62] Division of Ser. No. 489,595, July 18, 1974.

[52] U.S. Cl. ................................. 249/142; 164/368
[51] Int. Cl.² ........................ B28B 7/16; B22C 9/10
[58] Field of Search .......... 249/142, 152, 145, 151, 249/175, 176, 177, 180; 164/113, 303, 340, 341, 368, 369, 370

[56] References Cited
UNITED STATES PATENTS
1,999,511   4/1935   Meyer ................................ 164/368

*Primary Examiner*—Francis S. Husar
*Assistant Examiner*—John S. Brown
*Attorney, Agent, or Firm*—Arthur Frederick; Raymond P. Wallace

[57] ABSTRACT

A die-cast peripheral housing for the rotor of rotary combustion engines, having cast-in passages for liquid cooling, the passages providing optimum wall thickness and coolant flow at the region of high heat input.

5 Claims, 7 Drawing Figures

MOLD FOR DIE-CAST ROTOR HOUSING FOR ROTARY COMBUSTION ENGINES

This is a division of application Ser. No. 489,595, filed July 18, 1974.

BACKGROUND OF THE INVENTION

This invention relates to rotary combustion engines of trochoidal type, and more particularly to a die-cast rotor housing having liquid cooling means for such engines.

In rotary engines of this type the pattern of heat flux is not uniform around the periphery of the engine, because each of the various phases of the engine cycle always takes place adjacent to the same portion of the housing. As a result, the peripheral shell in the region in which the combustion phase occurs has a much higher rate of heat input than other portions of the shell. This was recognized in U.S. Pat. No. 3,007,460 to Bentele, Jones, and Sollinger, issued Nov. 7, 1961. In that patent axial passages for flow of liquid coolant through the double-walled peripheral shell are provided, there being more of such passages in the circumferential zone wherein combustion occurs.

The inner wall of the peripheral shell requires a certain thickness at its side faces both radially inward and outward of the coolant passages for the provision of gasket grooves, and in the prior art this thickness was carried uniformly across the axial width of the shell, that is, the passages went straight through in the axial direction. It was not recognized that the pattern of heat flux also varies axially across the width of the shell, with the highest heat input at the midplane between the side walls. An inner wall of constant thickness makes no provision for this circumstance, with the result that the thickness required to accomodate the gaskets, when carried straight across, leaves the thickness at midplane too high to permit cooling at that point to the desired temperature of the working surface. Also, uneven cooling may cause distortions and occasional cracks, as well as undesirable wear and erosion of the inner surface.

In the copending U.S. application of Charles Jones, Ser. No. 489,825 filed July 18, 1974, now abandoned and having a common assignee with the present invention, provision is made for balanced heat removal from the shell in accordance with the axial pattern of heat flux, by making the inner wall of the shell in the region of high heat input thinner at the axial midplane of the shell than at its axial edges. That invention, however, contemplates only sandcasting of the shell, which is the conventional way of forming such elements of a rotary engine.

Sand-casting is a slow and relatively expensive mode of fabrication, and it is desirable to form the shell by means of diecasting, which would greatly increase production and lower costs. It has heretofore been impracticable to form by die-casting a peripheral shell of a rotary engine wherein the generally axial coolant passages are canted radially inwardly from their axial ends toward the midplane of the shell in order to reduce the inner wall thickness at that location. When a casting die is opened to discharge the product, the several parts of the die must each be retracted only in a straight line. Since the coolant passages of a peripheral shell are circumferentially disposed around the generally annular housing, and since the axial ends of such canted passages are disposed further radially outwardly than at the midplane of the shell, normal die-casting practice would require a die with a separately movable finger or slide from each side to form each passage, each such slide being retractable along its own axis. The cost of such a die and the associated mechanism for withdrawing each finger separately along a different line would be prohibitive and would more than offset the savings ordinarily realized by die-casting.

The present invention overcomes these difficulties.

SUMMARY

The present invention provides a die-cast double-walled peripheral housing shell for rotary combustion engines of trochoidal type, having generally axially disposed coolant passages between the double walls thereof, the axially outer ends of the passages being disposed further radially outwardly than the midportions of the passages to provide a thin-sectioned inner wall at the midportion of the shell, and a means of die-casting the shell with a minimum number of mold parts. Provision is also made for forming the coolant passages with a smaller cross-section at the midplane of the shell than at the axial ends of the passages, in order to accelerate coolant flow at the center where heat input is highest and thereby minimize temperature variation across the shell. The die-casting is performed in a permanent mold by pressure die-casting, by gravity-fed pressure casting, or by centrifugal casting.

It is an object of this invention to provide a die-cast peripheral rotor housing for a trochoidal rotary engine.

It is another object to provide a die-cast rotor housing having generally annular double walls with coolant passages extending in a generally axial direction between the walls thereof, at least some of the passages having their axially outer ends disposed further radially outwardly than the midportion of the passages so that the shell inner wall is thinner at the midportion than at the side faces.

A further object is to provide such a housing shell wherein the coolant passages have a smaller cross-section at the midportion than at their ends, to accelerate coolant flow in the midportions.

Still another object is to provide a multipart permanent mold for forming such peripheral shells.

Other objects and advantages will become apparent on reading the following specification in connection with the accompanying drawings.

DESCRIPTION OF THE PREFERRED EMBODIMENTS

Figure 1:
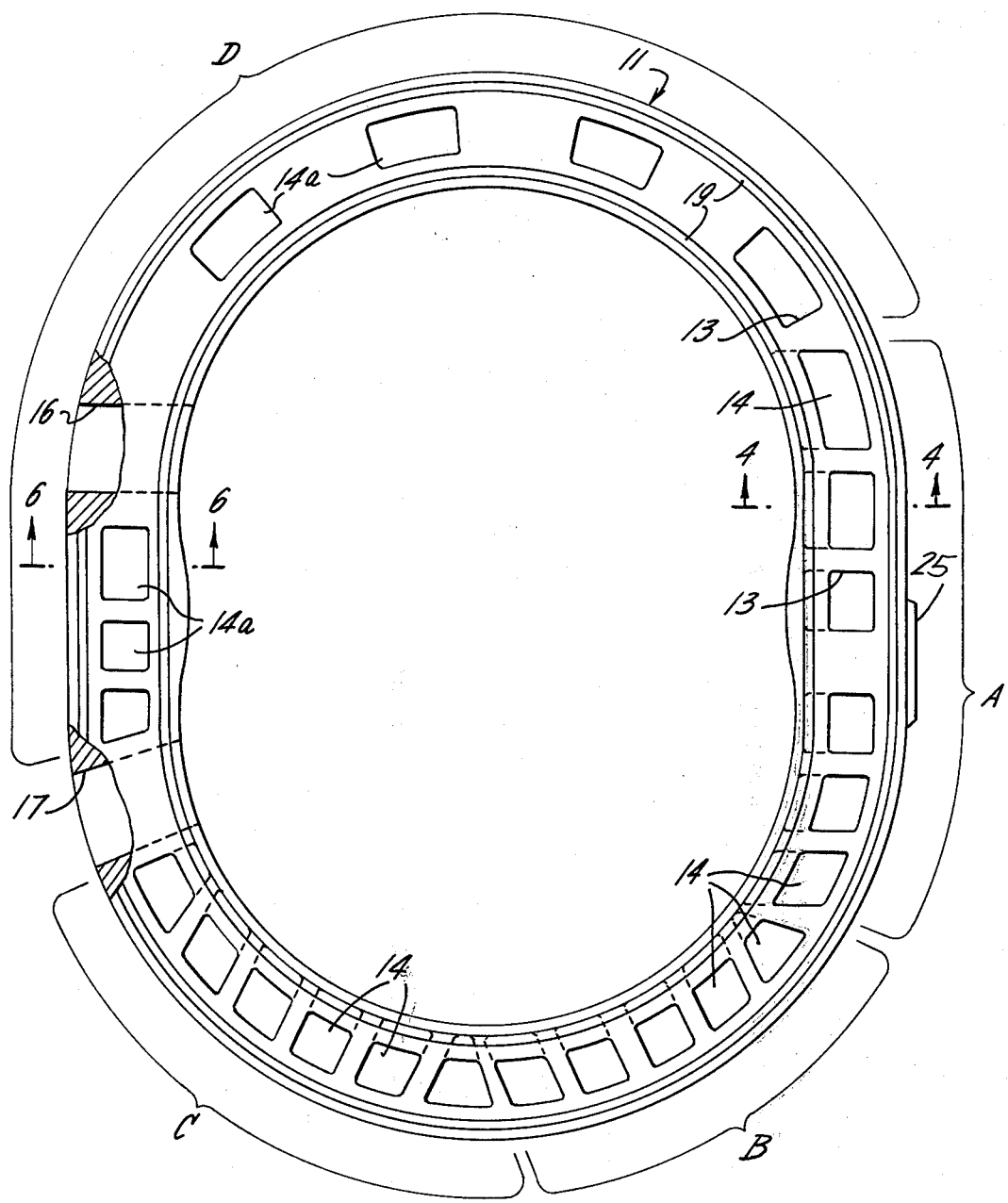
FIG. 1 is a view along the axis of the generally annular, double-walled peripheral shell of the invention.

FIG. 1 shows a view of the side face of a peripheral shell or rotor housing 11 of a trochoidal engine of two lobes, although it will be understood that this invention is also applicable to such engines having other number of lobes. The shell 11 has an inner trochoidal surface 12 and comprises a generally annular diecast member having double walls spaced apart radially by ribs or webs 13, and generally axially oriented coolant passages 14 and 14a extending from side to side of the shell between the double walls and spaced apart circumferentially by webs 13. The shell may be provided with a peripheral inlet port 16 and a peripheral outlet port 17 extending generally radially through the shell as shown, but it may be preferred to have either of such ports in one or both of the engine side walls 18 (shown in FIG. 2) which close the shell to form the engine cavity.

Figure 5:
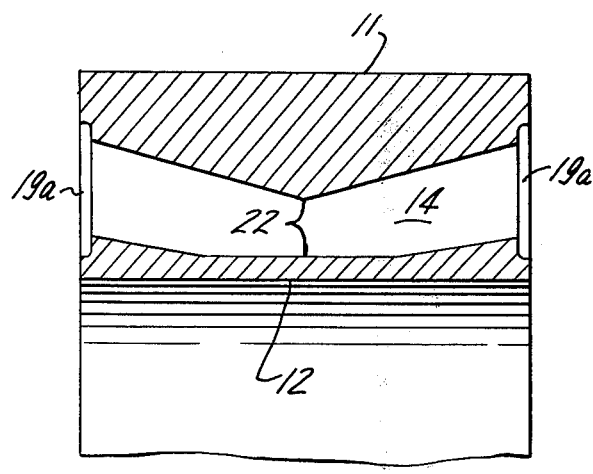
FIG. 5 is a similar view showing another embodiment of the shell with a coolant passage of modified form.

Each side face of the shell may also be provided with circumferential gasket grooves 19 disposed radially inside and outside the coolant passages, but alternatively may have the channels 19a for the gasketing arrangement shown in FIG. 5. One or more bosses 25 for spark plugs, fuel injectors, or other uses may also be provided, disposed at appropriate locations.

The circumferential brackets A, B, C, and D surrounding the shell 11 denote zones of heat input to the shell, zones A, B, and C collectively comprising the region of highest heat input. During operation of the engine a fresh charge of fuel-air mixture, or air for subsequent injection of fuel, is taken in through the inlet port. Bracket A delineates approximately the region of highest compression of the engine, wherein combustion is initiated. Zone B is the region of initial expansion of the burning gases, and zone C is the region of final expansion before discharge of the gases through the exhaust port. Zone D comprises principally the region of intake of fresh charge and the beginning of compression, wherein heat input to the shell from the interior of the engine cavity is negligible, but wherein the shell walls receive some heat by conduction from the regions where combustion takes place.

In an assembled engine the shell passages receive the coolant from headers or other channels in a side wall and discharge it to similar channels in the opposite side wall. Coolant from pumping means is introduced into the system usually at the beginning of the hot zone, and all the passages are interconnected for flow of the coolant back and forth serially through the circumferentially disposed passages of the shell until taken off to a radiator. For this reason the shell passages 14 in the hot region have small cross-sections to accelerate the flow, and are numerous to provide adequate cooling. Passages 14a in the cool zone D may be fewer in number and of larger cross-section to accommodate the total flow, high velocity being of less importance in the cool zone. The number and proportions of coolant passages 14 and 14a shown in FIG. 1 are not intended to be specific, but only to illustrate a general relation.

The variant circumferential distribution of heat input to the shell is provided for in the distribution of the coolant passages, but heat input in the hot region collectively denoted by the brackets A, B, and C also varies in the axial direction, across the width of the shell. This is shown by the schematic representation of FIG. 2. The peripheral shell 11 and the side walls 18 are fragmentarily shown, with a general curve 21 representing the pattern of heat distribution to the shell in the axial direction. From the curve 21 it will be seen that the highest rate of heat input to the shell in the axial direction is approximately at the midplane 22 between the side walls 18, dropping off to a noticeably lower value in the vicinity of the side walls.

The peripheral shell 11 is formed of metal, and in sandcastings of the prior art has commonly been formed of iron or an aluminum alloy. For speed of production and resultant economy it is preferable that it should be die-cast in a permanent mold, of one of the die-casting alloys such as aluminum or magnesium. If the coolant passages were straight in the axial direction from one side of the shell to the other, the production of a suitable die would present no problem. The side elements of the mold would each have a plurality of axially extending fingers which would meet at the midplane of the shell, and after the casting shot the side elements of the die would be retracted in the straight axial direction, leaving passages formed by the fingers.

Figure 2:
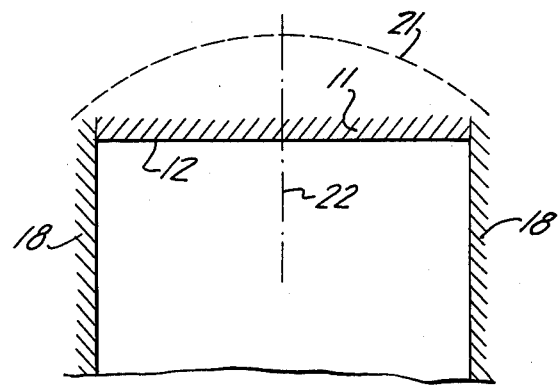
FIG. 2 is a diagrammatic view and graph showing the relative rates of heat input to the peripheral shell in the axial direction in certain portions of the shell.

However, in the region of high heat input to the shell, that is, zones A, B, and C, it is desirable to have the inner wall of the shell thinner at the midplane than at its edges in order to remove heat therefrom in accordance with the pattern of axial heat input shown in FIG. 2, thus minimizing temperature variation across the shell. This is accomplished by providing the mold 23 shown in FIG. 3.

Mold 23 is a multipart die having a pair of side pieces 24 each having a projection 26 of trochoidal profile protruding axially inwardly and meeting at the midplane of the mold cavity. These projections 26 define the trochoidal inner surface 12 of the completed shell casting. After solidification of the casting, side parts 24 are retracted in the straight axial direction, as shown by the broad arrows. The draft angle on projections 26 need only be very slight, and has been somewhat exaggerated in the drawings. For a draw of one inch a taper of about ½° between the axis and the surface is sufficient; for a draw of about 3 inches a taper of approximately 1° is suitable. For longer draws the taper may be appropriately increased.

The remainder of the mold comprises a plurality of circumferential pieces which collectively close around the side pieces 24 and their trochoidal projections 26 to define a generally annular mold cavity 27. Circumferential pieces 28 have a generally L-shaped cross-section, one leg 29 of which surrounds and abuts a portion of the circumference of side piece 24, the other leg 31 meeting the corresponding leg 31 of the opposite circumferential piece which is a mirror image.

Each leg portion 29 of circumferential pieces 28 has protruding from its axial inner surface a plurality of fingers 32 extending inwardly in the generally axial direction, and of appropriate size and shape to form the coolant passages 14 of the peripheral shell. However, the fingers 32 are canted from strict parallelism with the axis, their inner ends being radially closer to the axis than their bases, the fingers thus pointing slightly inwardly toward a plane parallel with the axis. The fingers protruding from each die part 28 have plane surfaces on their inner ends and meet the corresponding fingers protruding from the opposite side at the midplane of the die, thus providing a thin inner wall of the housing shell 11 at the midplane 22.

Since the fingers 32 are disposed and spaced apart in the circumferential direction, it is not practicable to have each finger pointing toward the axial line of the mold. Such a disposition would place the fingers in a conical array with a different angle for each, requiring a separate die part for each finger, each being retractable along a different angle. Instead, a certain number of fingers for passages 14 are grouped for a single die part. The type of grouping is shown in FIG. 1. The passages for zone A can be grouped for forming by a single pair of opposed die parts 28, a second pair being used for the passages of zone B; and a third pair for zone C. All the fingers 32 grouped on any single die piece 28 have their own axes parallel to each other and their inner ends slanted toward a plane which is approximately a plane including the chord of the curvature of the circumferential piece 28 from which they extend. Thus, after the casting has solidified in the mold each piece 28 can be retracted in a direction parallel with the axes of its fingers, as shown by broad arrows in FIG. 3.

It is to be understood that the groupings for each die part 28 need not be precisely those shown under the brackets A, B, and C. The number of passages which can be grouped and their circumferential extent depend in part on the degree of curvature in any given part of the housing, the size of the passages, and the desired thickness of the separating ribs.

Die parts 28 may also have a pair of circumferential lands 33 protruding from the inner faces of legs 29, for forming the gasket grooves 19, one land 33 being disposed radially inwardly of fingers 32 and the other land radially outwardly of the fingers. The radially outward surfaces of lands 33 are sloped parallel with fingers 32, in order to offer no resistance when the die parts are retracted in a direction parallel with the fingers.

Other means for forming gasket channels may be provided, as for forming the gasket channels 19a of the housing shown in FIG. 5. Channels 19a receive a flat circumferential gasket which is apertured at the coolant passages, rather than the pair of O-rings or similar gaskets which are installed in channels 19. When gasket channels of the form 19a are to be utilized, the inner faces of legs 29 of die parts 28 will have flat circumferential protrusions of appropriate form and size, with the fingers 32 extending from the gasket-forming protrusions. Gasket channels of either form of 19 or 19a may be provided in either of the housing embodiments shown in FIGS. 4 and 5.

The coolant passages 14a being in a generally cooler region of shell 11, need not have the inner wall of the shell thinned at the midplane. Passages 14a may extend straight through in the axial direction between the walls of the shell. In this case passages 14a may be formed by a single pair of circumferential die pieces 36, shown at the bottom of FIG. 3, wherein the fingers 32 extend from the inner faces of die parts 36 in the straight axial direction, and the die parts are retracted axially, the circumferential curvature of the die part presenting no problem for retraction parallel with the mold axis.

Figure 3:
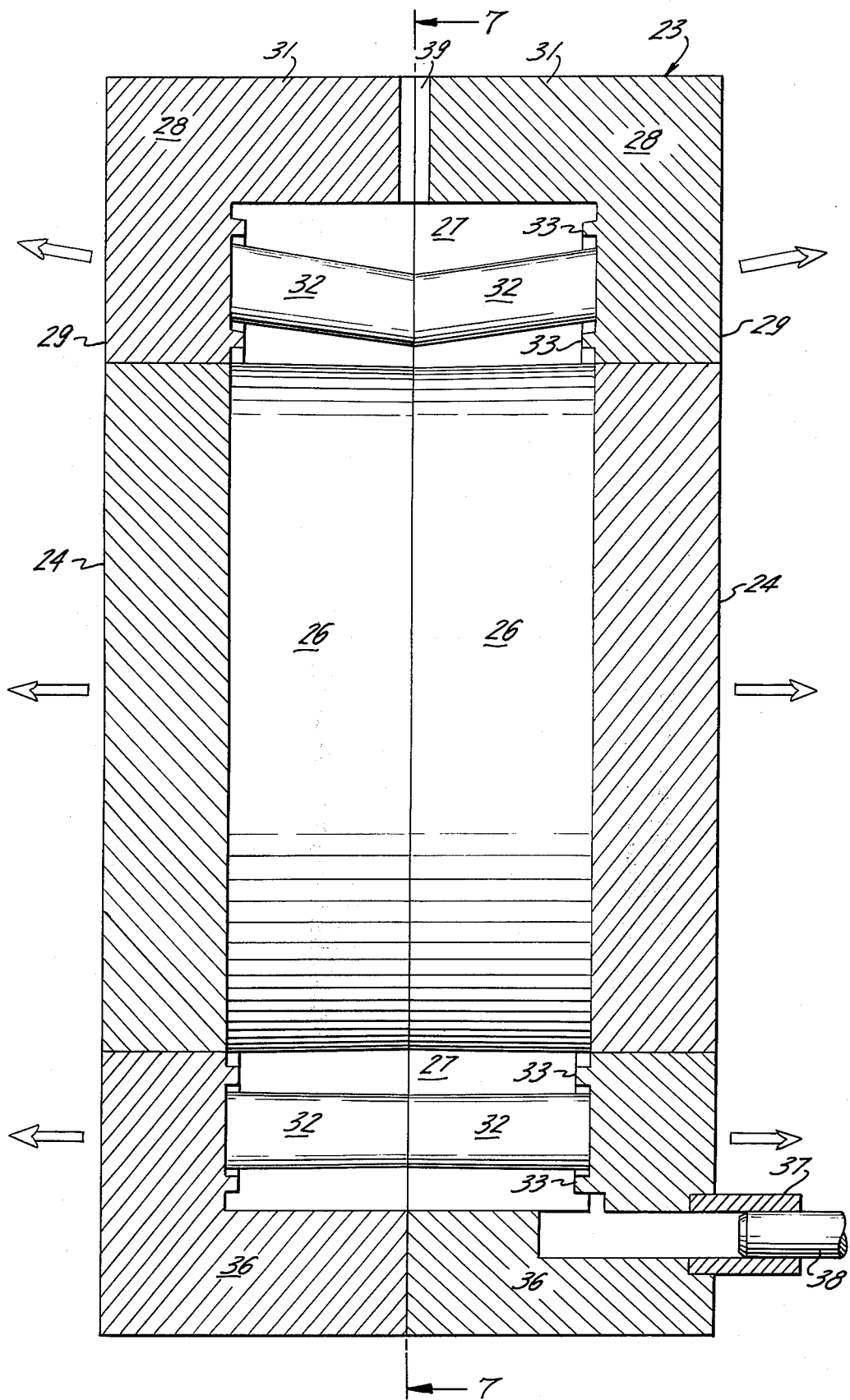
FIG. 3 is a cross-sectional elevation of an assembled permanent mold for forming the shell.
Figure 7:
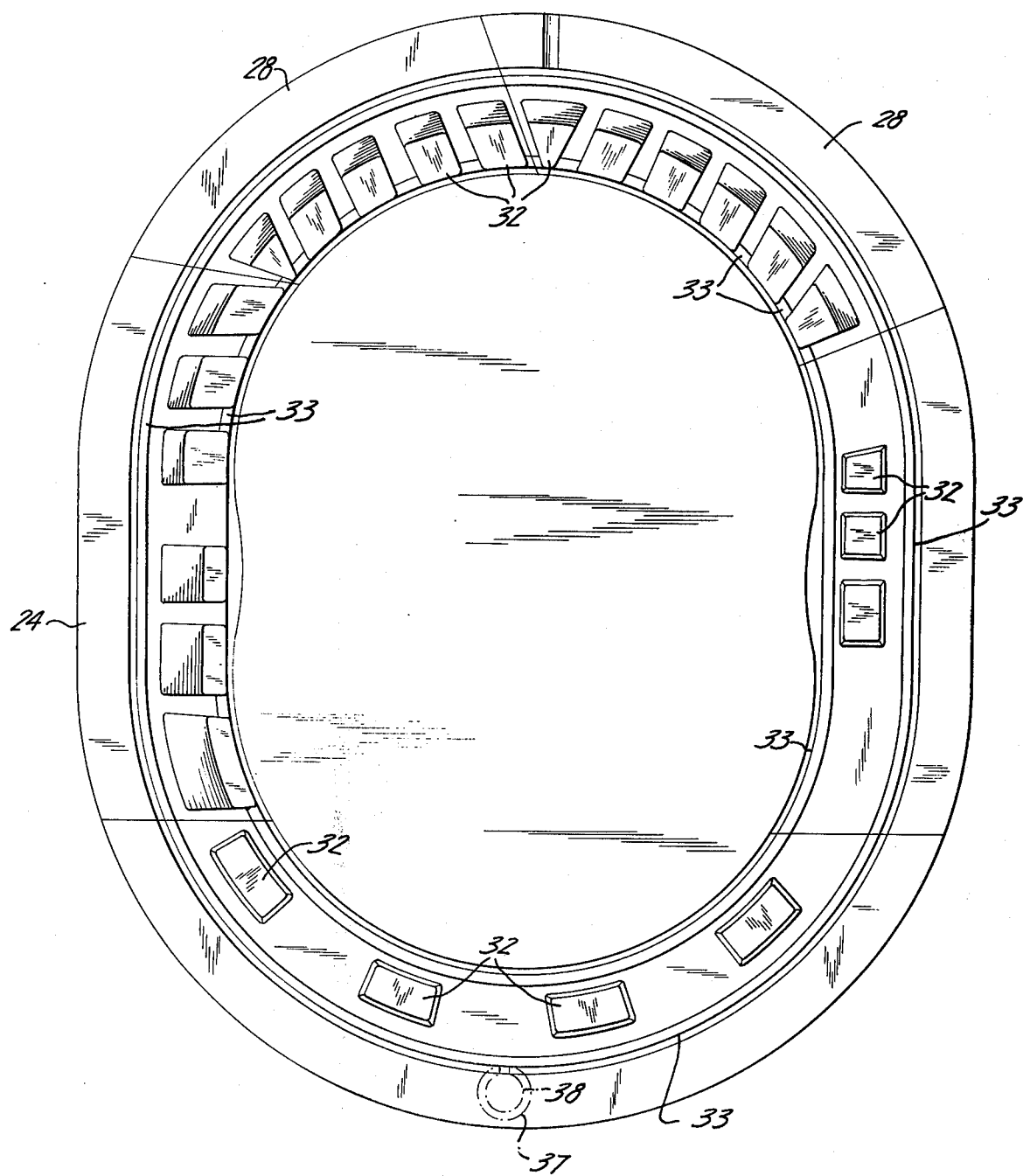
FIG. 7 is a cross-sectional view taken substantially along line 7—7 of FIG. 3, on a somewhat smaller scale.

The permanent mold assembly 23 is shown in FIG. 3 as a pressure die-casting mold, having a shot sleeve 37 and a ram 38 for injecting molten metal, and one or more appropriate venting apertures 39 disposed at convenient locations. Knockout pins may also be provided if required. Although shown for pressure die-casting, it is to be understood that the permanent mold may also be for gravity-fed pressure casting, or that centrifugal casting may be employed. Elements for closing and opening the mold are conventional and therefore not shown.

Figure 4:
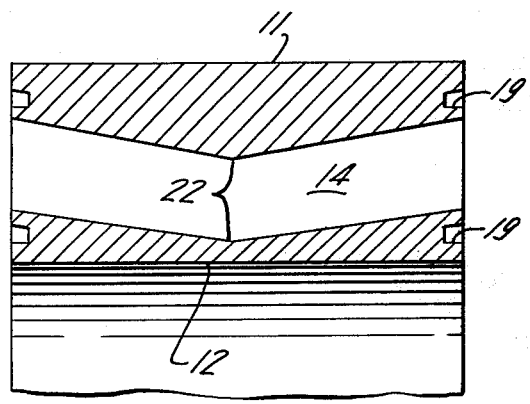
FIG. 4 is a fragmentary cross-section in elevation taken on line 4—4 of FIG. 1 and showing one of the coolant passages.

FIG. 4 is a fragmentary cross-section through a portion of a peripheral shell 11, showing one of the coolant passages 14. The inner wall of the shell is thinnest at the midplane 22, having been formed by the slanted fingers 32 of the die parts 28 shown in FIG. 3, but still has enough thickness at its axial faces to hold the gasket grooves 19. As shown in FIG. 4 the passage 14 has a substantially constant cross-section throughout its length, the only variation being that of the draft angle of the fingers, which is negligible, being of the order of ½° to 1°.

Although the invention has been described thus far in connection with the forming of coolant passages of constant cross-section, it is desirable in some instances to have passages of diminished cross-section in the midportion in order to accelerate coolant flow in that portion and further minimize temperature variation across the shell in the axial direction. FIG. 5 shows an embodiment wherein passage 14 has a markedly smaller cross-section at the midplane 22 than at the ends. This configuration is produced by giving the axes of the die fingers 32 a somewhat greater angle of slant toward the chordal plane than in the previous embodiment, and tapering off the radially inward sides of the fingers to the desired smaller cross-section at their meeting ends in the midplane of the mold. There is no tapering of the circumferential sides of the fingers, in order that the rib thicknesses and the circumferential width of the passages shall remain unchanged, and the tapering of the radially inward surfaces requires the higher degree of angularity from parallelism with the mold axis, in order that the midportion of the inner wall of the housing shell will have the same thickness as the minimum thickness in FIG. 4. Such an arrangement also allows the thin midportion of the inner wall to have considerable axial extent, as shown in FIG. 5. About one-fourth to one-half of the middle portion of the inner wall in such passages may have a constant thickness at the minimum value, approximately the middle one-third being a convenient proportion.

The passages 14 of FIG. 5, reduced in their cross-section at the midportion by diminishing only their radial dimension in that region, have the advantage of gradual increase of the velocity of coolant flow from its entrance at one axial end of the passage to the midportion, followed by an equivalent decrease of velocity to its exit at the opposite end of the passage.

Figure 6:
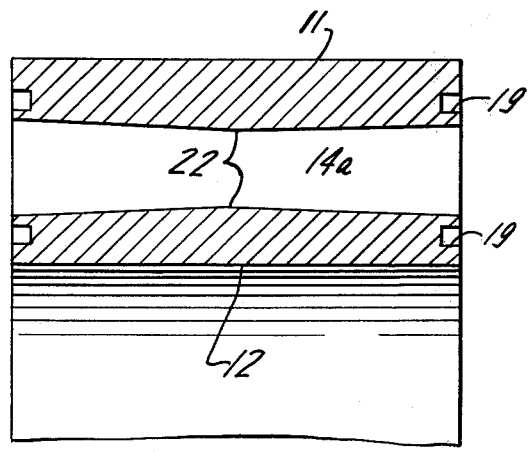
FIG. 6 is a similar view taken on line 6—6 of FIG. 1 and showing one of the coolant passages in the portion of the shell wherein the inner wall is not thinned.

FIG. 6 shows one of the coolant passages 14a in the cooler portion of the shell 11, formed by die parts 36 having fingers extending axially, with a straight pull of the die.

From the foregoing description it will be seen that this invention provides a permanent mold-cast peripheral rotor housing for a trochoidal engine, the shell being generally annular and having double walls with coolant passages extending in the generally axial direction therebetween, the inner wall in at least some of the passages being thinner at the midplane of the shell than at the axial side faces. Also provided is a method of die-casting such a shell, and a permanent mold for practicing the method.

What is claimed is:

1. A permanent mold for pressure-casting a generally annular rotor housing shell for trochoidal engines, the shell having a longitudinal axis and parallel side faces normal to the axis and having an inner wall with a trochoidal inner surface and an outer wall spaced radially from the inner wall and having a plurality of generally axially oriented passages therethrough between the inner and outer walls and spaced circumferentially around the shell, the permanent mold comprising:
- a. a pair of opposed side pieces each having a plug of trochoidal cross-section projecting inwardly therefrom parallel with the shell axis, each plug having a plane face on its projecting end, the plane faces meeting at the midplane of the mold, each of the side pieces being retractable along the line of the shell axis;
- b. a plurality of opposed arcuate pieces of L-shaped cross-section circumferentially surrounding the side pieces, the first leg of each of the arcuate pieces being in contact with a side piece and the second leg extending to the midplane of the mold and having a plane face meeting the opposed plane face of the opposite arcuate piece;
- c. the extending second legs of the arcuate pieces surrounding the trochoidal plugs of the side pieces and being radially spaced therefrom, the side pieces and the arcuate pieces collectively defining a generally annular mold cavity around the trochoidal plugs;
- d. the inner faces of the first legs of each of the arcuate pieces having a plurality of fingers extending therefrom in the generally axial direction into the mold cavity and meeting like fingers from the opposite arcuate piece at the midplane of the cavity, the fingers of at least some of the arcuate pieces having their individual axes slanted from each side angularly to the mold axis to a position radially closer to the mold axis at their meeting point at the midplane; and
- e. the arcuate pieces having slanted fingers being retractable in the direction parallel to the finger axes.

2. The combination recited in claim 1, wherein the fingers on each arcuate piece having slanted fingers have their individual axes parallel to each other and nonparallel to the individual axes of the fingers on other arcuate pieces.

3. The combination recited in claim 2, wherein each of the fingers having slanted axes has a substantially constant cross-section throughout its length.

4. The combination recited in claim 2, wherein each of the fingers having slanted axes has a cross-section diminishing from relatively larger at the inner face of the first leg of its arcuate piece to relatively smaller at its end at the midplane of the mold.

5. The combination recited in claim 4, wherein each of the fingers of diminishing cross-section has a flat portion on its radially inward side approximately parallel to the mold axis, the flat section extending from the mold midplane toward the arcuate piece for a distance of about one-eighth to one-fourth of the length of the fingers.

* * * * *